(12) United States Patent
Renes et al.

(10) Patent No.: US 11,611,668 B2
(45) Date of Patent: Mar. 21, 2023

(54) IMAGE PROCESSING SYSTEM THAT GENERATES JOB SETTING INFORMATION BASED ON INTERACTION WITH USER OF INFORMATION PROCESSING APPARATUS USING CHATBOT

(71) Applicant: KYOCERA Document Solutions Inc., Osaka (JP)

(72) Inventors: Reuben Anthony Renes, Osaka (JP); Jay Escopete, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/699,811

(22) Filed: Mar. 21, 2022

(65) Prior Publication Data
US 2022/0311879 A1 Sep. 29, 2022

(30) Foreign Application Priority Data

Mar. 26, 2021 (JP) .............................. JP2021-054033

(51) Int. Cl.
*H04N 1/00* (2006.01)
*G06F 3/12* (2006.01)
*H04N 1/32* (2006.01)
*H04L 51/02* (2022.01)

(52) U.S. Cl.
CPC ......... *H04N 1/00212* (2013.01); *G06F 3/126* (2013.01); *G06F 3/1226* (2013.01); *G06F 3/1253* (2013.01); *G06F 3/1267* (2013.01); *G06F 3/1285* (2013.01); *H04L 51/02* (2013.01); *H04N 1/00244* (2013.01); *H04N 1/32106* (2013.01); *H04N 2201/3269* (2013.01)

(58) Field of Classification Search
None
See application file for complete search history.

(56) References Cited

U.S. PATENT DOCUMENTS

| | | | |
|---|---|---|---|
| 2020/0344375 A1* | 10/2020 | Ishii | ........................ H04L 51/02 |
| 2021/0055897 A1 | 2/2021 | Tomihisa | |
| 2021/0321010 A1* | 10/2021 | Tokuchi | ............. H04N 1/00493 |
| 2022/0214845 A1* | 7/2022 | Ohashi | .................. H04L 51/046 |

FOREIGN PATENT DOCUMENTS

JP 2021033425 A 3/2021

* cited by examiner

*Primary Examiner* — Henok Shiferaw
(74) *Attorney, Agent, or Firm* — IP Business Solutions, LLC

(57) ABSTRACT

In an image processing system, an interactive message is transmitted and received between an information processing apparatus and a chatbot server, job setting information is generated, image data and the job setting information are stored in a storage on a network in association with job identification information, a QR code generated from the job identification information is displayed on a screen of the information processing apparatus, an image forming apparatus is caused to read the QR code and to convert the QR code to job identification information, and the image data and the job setting information associated with the job identification information are transmitted from the storage to the image forming apparatus via the management server.

8 Claims, 9 Drawing Sheets

IMAGE PROCESSING SYSTEM THAT GENERATES JOB SETTING INFORMATION BASED ON INTERACTION WITH USER OF INFORMATION PROCESSING APPARATUS USING CHATBOT

INCORPORATION BY REFERENCE

This application claims priority to Japanese Patent Application No. 2021-054033 filed on Mar. 26, 2021, the entire contents of which are incorporated by reference herein.

BACKGROUND

The present disclosure relates to an information processing system in which an image is transmitted from an information processing apparatus such as a mobile phone or a person computer (PC) to an image forming apparatus via a server on a network and the image is processed by the image forming apparatus and more particularly to a technique for performing processing based on an interaction with a user of an information processing apparatus using a chatbot.

An image processing system that transmits an image from an information processing apparatus to an image forming apparatus via a server on a network and processes the image using the image forming apparatus is known. A chatbot is an application program for having a dialogue with a user and is applicable to an image processing system.

For example, an image processing system includes a management means that manages user information and information of an image processing apparatus and a provision means that provides a chatbot function for supporting a user's operation as a bot in a chatting application service. When an image processing request is received via a chatting screen of the chatting application service, the provision means identifies an image processing apparatus which can be used by the user having input the image processing request out of a plurality of image processing apparatuses on the basis of information managed by the management means and provides information of the identified image processing apparatus via the chatting screen.

SUMMARY

An aspect of the present disclosure provides an improvement of the aforementioned technique.

An image processing system according to an aspect of the present disclosure includes an information processing apparatus, a chatbot server, a management server, and an image forming apparatus that perform data communication with each other via a network.

The chatbot server includes a first communication device and a first control device. The first control device performs data communication with the information processing apparatus and the management server via the network. The first control device causes the first communication device to transmit and receive an interactive message to and from the information processing apparatus. When image data and the message transmitted from the information processing apparatus are received by the first communication device, the first control device generates job setting information on the basis of the message and causes the first communication device to transmit the generated job setting information to the management server. When a position of the image forming apparatus having a function suitable for the job setting information is transmitted from the management server and is received by the first communication device, the first control device sets job identification information in association with the received image data and the received job setting information and causes the first communication device to transmit the image data, the job setting information, and the job identification information to a storage on the network. The first control device generates a one-dimensional code or two-dimensional code indicating the job identification information and causes the first communication device to transmit the position of the image forming apparatus and the one-dimensional code or two-dimensional code to the information processing apparatus.

The management server includes a second communication device and a second control device. The second communication device performs data communication with the chatbot server and the image forming apparatus via the network. When the job setting information transmitted from the chatbot server is received by the second communication device, the second control device selects the image forming apparatus having a function suitable for the received job setting information and causes the second communication device to transmit the position of the selected image forming apparatus to the chatbot server. When the job identification information transmitted from the image forming apparatus is received by the second communication device, the second control device acquires the image data and the job setting information associated with the received job identification information from the storage on the network using the second communication device and causes the second communication device to transmit the acquired image data and the acquired job setting information to the image forming apparatus.

The information processing apparatus includes a third communication device, a display device, and a third control device. The third communication device performs data communication with the chatbot server via the network. The third control device displays the position of the image forming apparatus and the one-dimensional code or two-dimensional code on the display device when position information indicating the position of the image forming apparatus and the one-dimensional code or two-dimensional code which are transmitted from the chatbot server are received by the third communication device.

The image forming apparatus includes a fourth communication device, an input device, and a fourth control device. The fourth communication device performs data communication with the management server via the network. The one-dimensional code or two-dimensional code is input to the input device. When the one-dimensional code or two-dimensional code is input to the input device, the fourth control device converts the input one-dimensional code or two-dimensional code to job identification information and causes the fourth communication device to transmit the converted job identification information to the management server. When the image data and the job setting information transmitted from the management server are received by the fourth communication device, the fourth control device performs processing of the image data on the basis of the job setting information.

An image processing system according to another aspect of the present disclosure includes a chatbot server and a management server that perform data communication with an information processing apparatus and an image forming apparatus via a network.

The chatbot server includes a first communication device and a first control device. The first communication device performs data communication with the information processing apparatus and the management server via the network. The first control device causes the first communication device to transmit and receive an interactive message to and from the information processing apparatus. When image data and the message transmitted from the information processing apparatus are received by the first communication device, the first control device generates job setting information on the basis of the message and causes the first communication device to transmit the generated job setting information to the management server. When a position of the image forming apparatus having a function suitable for the job setting information is transmitted from the management server and is received by the first communication device, the first control device sets job identification information in association with the received image data and the received job setting information and causes the first communication device to transmit the image data, the job setting information, and the job identification information to a storage on the network. The first control device generates a one-dimensional code or two-dimensional code indicating the job identification information and causes the first communication device to transmit the position of the image forming apparatus and the one-dimensional code or two-dimensional code to the information processing apparatus.

The management server includes a second communication device and a second control device. The second communication device performs data communication with the chatbot server and the image forming apparatus via the network. When the job setting information transmitted from the chatbot server is received by the second communication device, the second control device selects the image forming apparatus having a function suitable for the received job setting information and causes the second communication device to transmit the position of the selected image forming apparatus to the chatbot server. When the job identification information transmitted from the image forming apparatus is received by the second communication device, the second control device acquires the image data and the job setting information associated with the received job identification information from the storage on the network using the second communication device and causes the second communication device to transmit the acquired image data and the acquired job setting information to the image forming apparatus.

DETAILED DESCRIPTION

Figure 1:
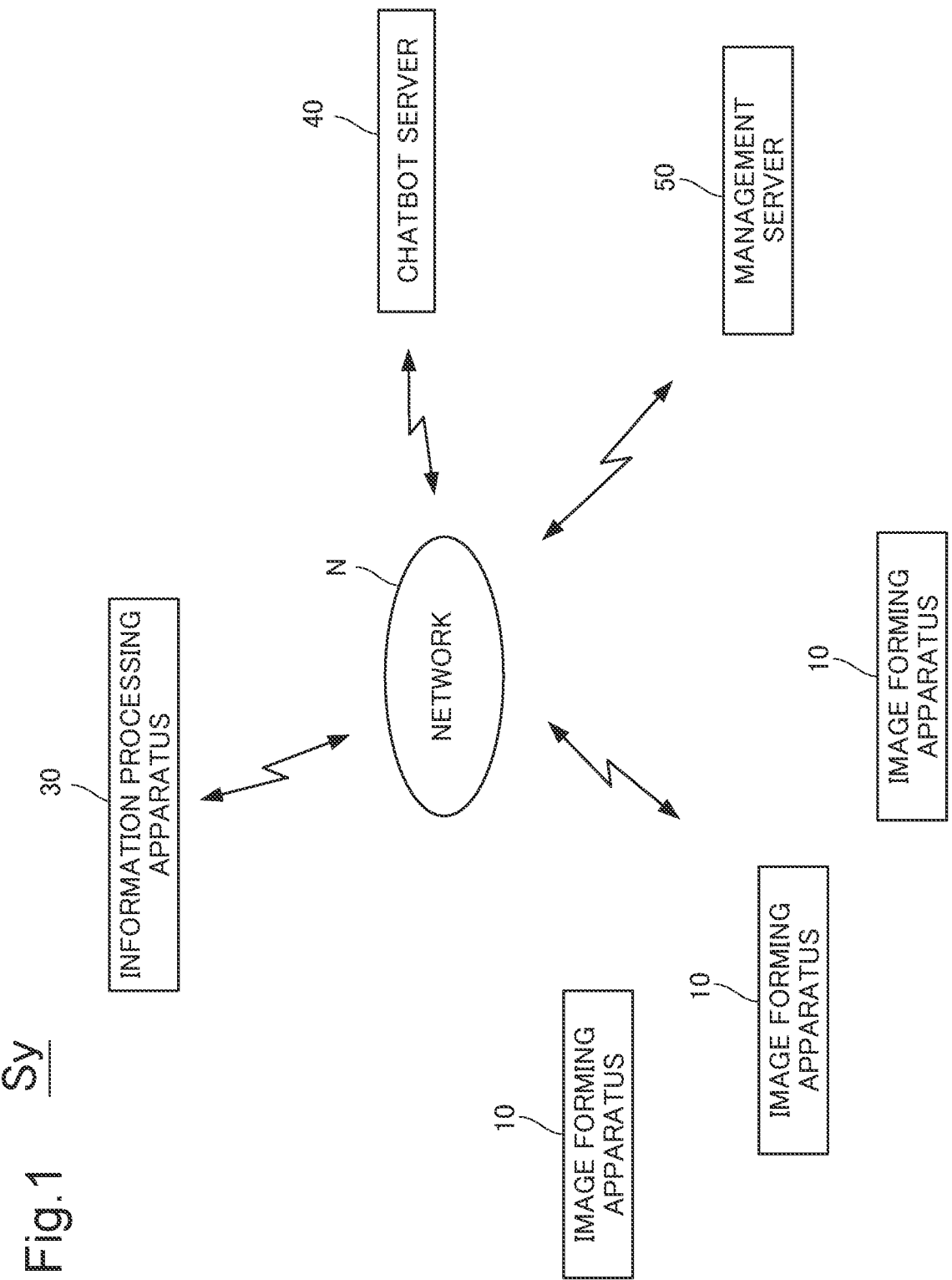
FIG. 1 is a block diagram illustrating a configuration of an image processing system according to an embodiment of the present disclosure.

Hereinafter, an embodiment of the present disclosure will be described with reference to the accompanying drawings. FIG. 1 is a block diagram illustrating a configuration of an image processing system according to an embodiment of the present disclosure. In an image processing system Sy according to this embodiment, a plurality of image forming apparatuses 10, an information processing apparatus 30, a chatbot server 40, and a management server 50 are connected to a network (such as an intranet) N, data communication is performed between the information processing apparatus 30 and the chatbot server 40 via the network N, data communication is performed between the chatbot server 40 and the management server 50 via the network N, and data communication is performed between the image forming apparatuses 10 and the management server 50 via the network N. The chatbot server 40 and the management server 50 may be configured as a single server.

Figure 2:
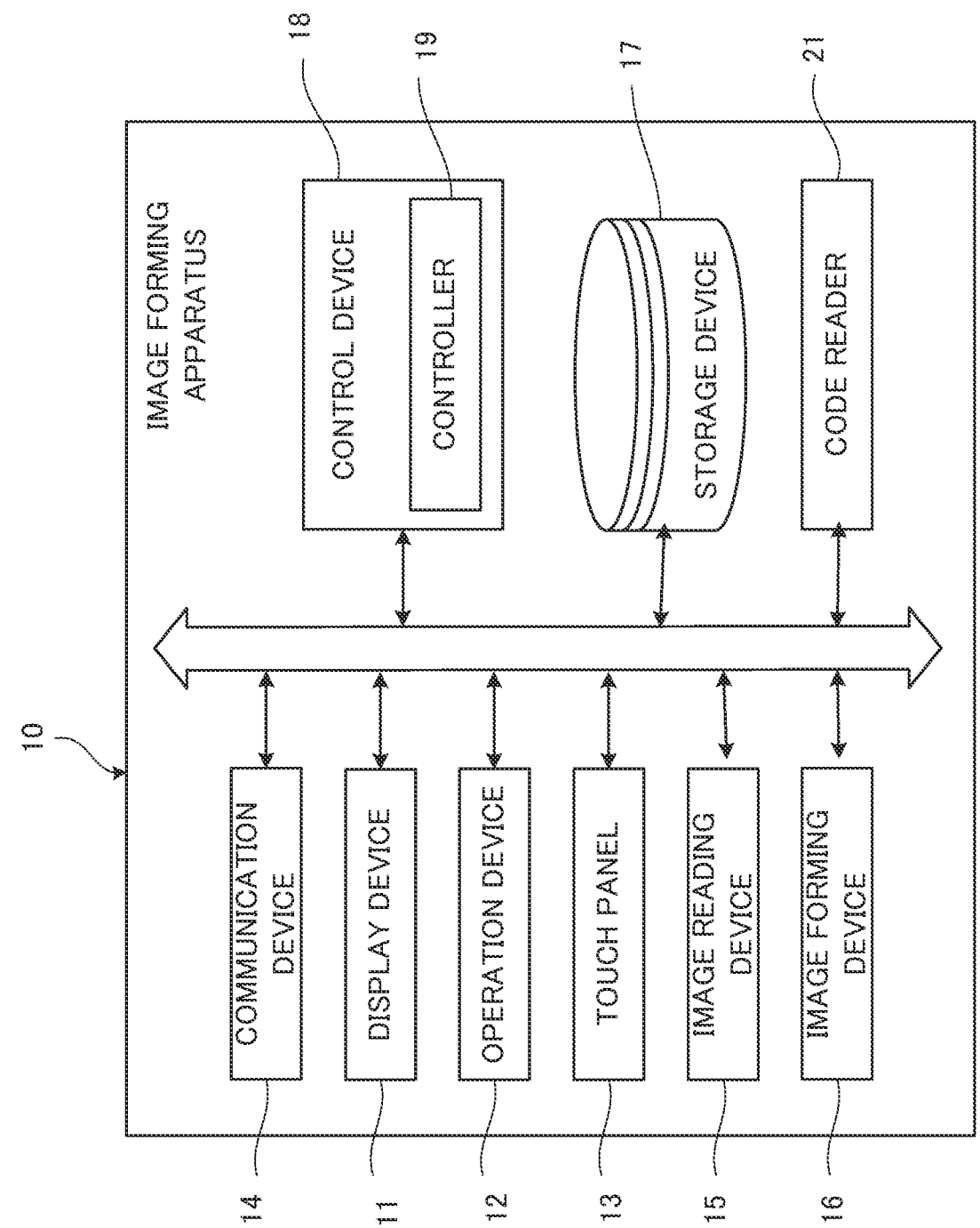
FIG. 2 is a block diagram illustrating a principal configuration of an image forming apparatus in the image processing system according to the embodiment.

FIG. 2 is a block diagram illustrating a principal configuration of an image forming apparatus 10. The image forming apparatus 10 is, for example, a multifunction peripheral (MFP) having a plurality of functions such as a copy function, a printer function, and a scanner function. The image forming apparatus 10 includes a display device 11, an operation device 12, a communication device 14, a touch panel 13, an image reading device 15, an image forming device 16, a storage device 17, a control device 18, and a code reader 21. These constituents are configured to transmit and receive data or signals via a bus.

The display device 11 includes a liquid crystal display (LCD) or an organic light-emitting diode (OLED) display.

The touch panel 13 is superimposed on a screen of the display device 11. The touch panel 13 detects a touch of a user's finger or the like with the touch panel 13 along with a touch position thereof and outputs a detection signal indicating coordinates of the touch position to a controller 19 of the control device 18. Accordingly, a graphical user interface (GUI) or the like displayed on the screen of the display device 11 can be operated using the touch panel 13.

The operation device 12 includes hardware keys such as numerical keys, an enter key, and a start key.

The image reading device 15 includes a scanner that optically reads an image of a document placed on a contact glass and generates image data indicating the image of the document.

The image forming device 16 includes a photosensitive drum, a charging device that uniformly charges a surface of the photosensitive drum, an exposure device that forms an electrostatic latent image on the surface of the photosensitive drum by exposing the surface of the photosensitive drum to light, a developing device that develops the electrostatic latent image on the surface of the photosensitive drum to a toner image, and a transfer device that transfers the toner image (image) on the surface of the photosensitive drum to a recording sheet which is a recording medium, and prints an image indicated by image data on the recording sheet.

The communication device 14 is a communication interface including a communication module such as an LAN chip. The communication device 14 is connected to the management server 50 via the network (such as an intranet) N and performs data communication with the management server 50.

The code reader 21 is an imaging camera that reads a QR code (registered trademark) (an example of a two-dimensional code).

The storage device 17 is a large-capacity storage device such as a solid state drive (SSD) or a hard disk drive (HDD) and stores various application programs and various types of data.

The control device 18 includes a processor, a random access memory (RAM), and a read only memory (ROM). The processor is, for example, a central processing unit (CPU), an application-specific integrated circuit (ASIC), or a micro processing unit (MPU). The control device 18 serves as a controller 19 by causing the processor to execute a control program stored in the ROM or the storage device 17. The controller 19 is an example of a fourth control device in the claims.

The controller 19 takes charge of overall control of the image forming apparatus 10. The control device 18 is connected to the display device 11, the operation device 12, the touch panel 13, the communication device 14, the image reading device 15, the image forming device 16, the storage device 17, the code reader 21, and the like. The controller 19 controls the constituents or transmits and receives signals or data to and from the constituents.

The controller 19 serves as a processing device that performs various processes. The controller 19 has a function of controlling the display device 11 and the communication device 14.

The controller 19 extracts a QR code from an image read by the code reader 21 and analyzes the extracted QR code.

Figure 3:
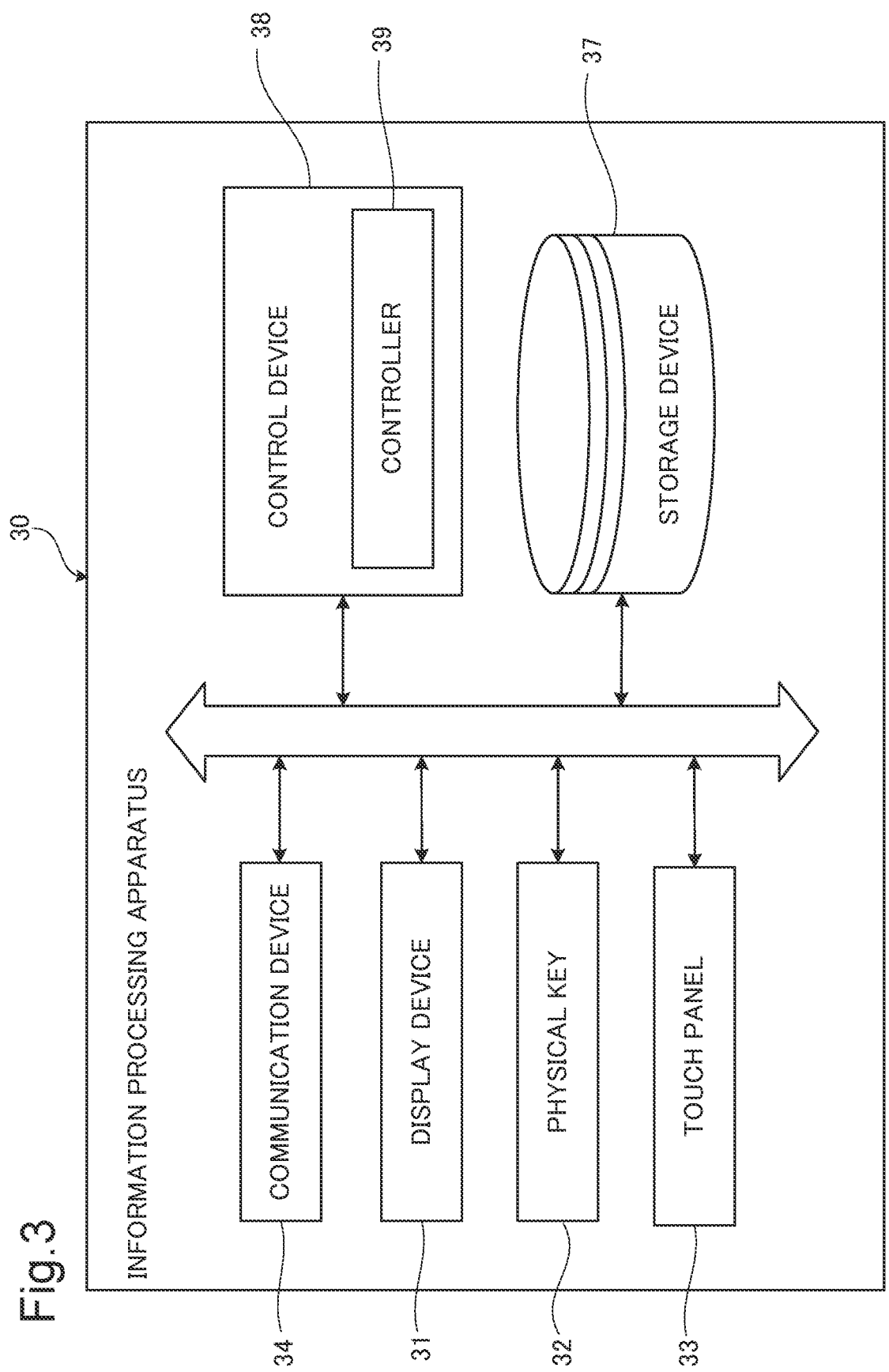
FIG. 3 is a block diagram illustrating a principal configuration of an information processing apparatus in the image processing system according to the embodiment.

FIG. 3 is a block diagram illustrating a principal configuration of the information processing apparatus 30. The information processing apparatus 30 is, for example, a portable smartphone or a mobile phone. The information processing apparatus 30 includes a display device 31, a touch panel 33, a communication device 34, a storage device 37, and a control device 38. These constituents are configured to transmit and receive data or signals via a bus.

The display device 31 includes a liquid crystal display (LCD) or an organic EL.

The touch panel 33 is a touch panel of a so-called a resistive membrane type or a so-called capacitive type. The touch panel 33 is superimposed on a screen of the display device 31, detects a touch of a user's finger or the like with the touch panel 33 along with a touch position thereof, and outputs a detection signal indicating coordinates of the touch position to a controller 39 of the control device 38. Accordingly, a GUI or the like displayed on the screen of the display device 31 can be operated using the touch panel 33.

The information processing apparatus 30 includes a physical key 32 in addition to the touch panel 33 as an operation device to which a user operation is input.

The communication device 34 is, for example, a communication interface, is connected to the chatbot server 40 via the network N, and transmits and receives data to and from the chatbot server 40.

The storage device 37 is a large-capacity storage device such as an SSD and stores various application programs or various types of data.

The control device 38 includes a processor, a RAM, and a ROM. The control device 38 serves as a controller 39 by causing the processor to execute a control program stored in the ROM or the storage device 37. The controller 39 is an example of a third control device in the claims.

The controller 39 takes charge of overall control of the information processing apparatus 30. The control device 38 is connected to the display device 31, the physical key 32, the touch panel 33, the communication device 34, the storage device 37, and the like. The controller 39 controls the constituents and transmits and receives signals or data to and from the constituents.

Figure 4:
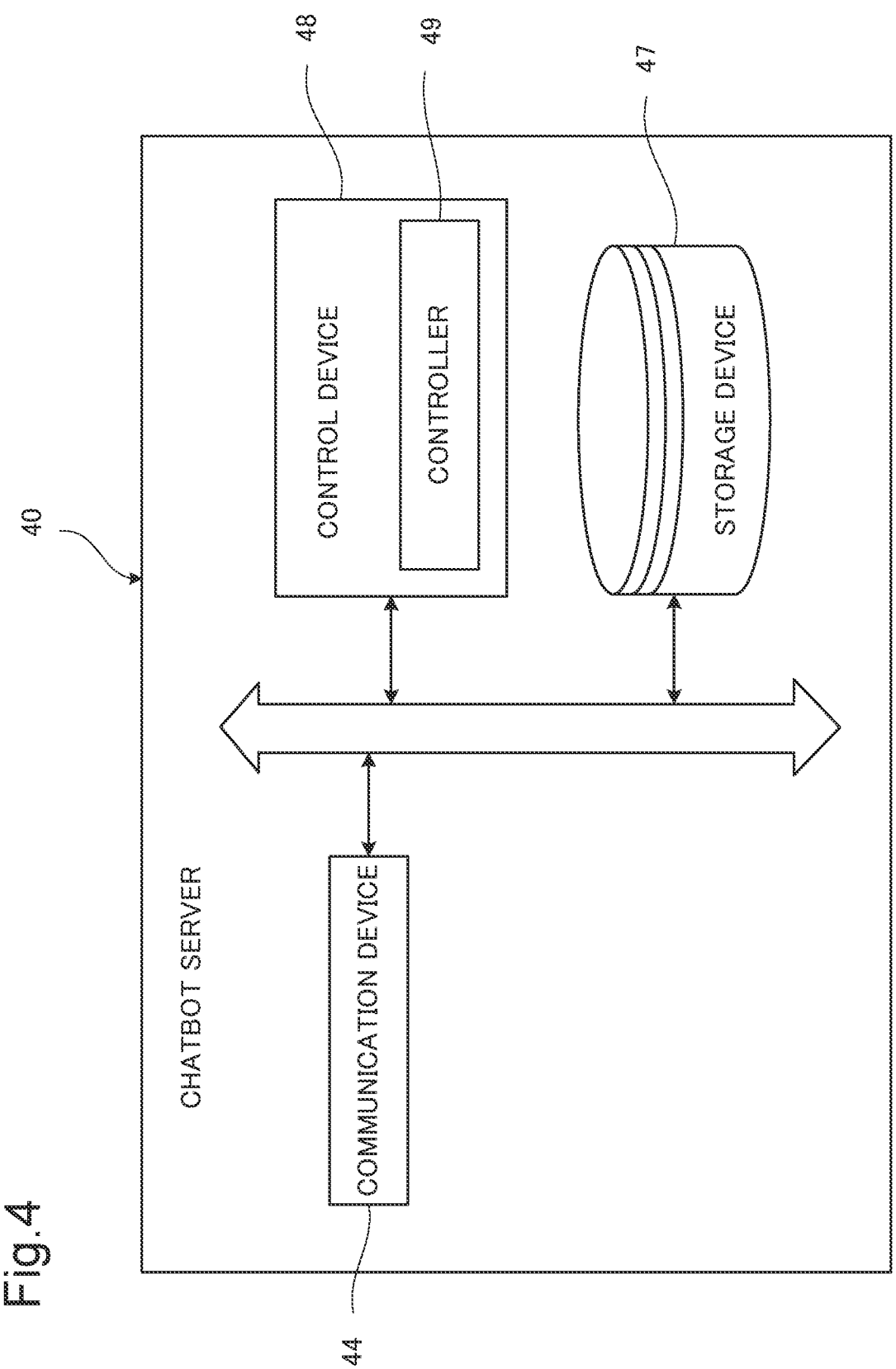
FIG. 4 is a block diagram illustrating a principal configuration of a chatbot server in the image processing system according to the embodiment.

FIG. 4 is a block diagram illustrating a principal configuration of the chatbot server 40. The chatbot server 40 includes a communication device 44, a storage device 47, and a control device 48. These constituents are configured to transmit and receive data or signals via a bus.

The communication device 44 is a communication interface, is connected to the information processing apparatus 30 and the management server 50 via the network N, and transmits and receives data to and from the information processing apparatus 30 and the management server 50.

The storage device 47 is a large-capacity storage device such as an SSD or an HDD and stores various application programs or various types of data.

The control device 48 includes a processor, a RAM, and a ROM. The control device 48 serves as a controller 49 by causing the processor to execute a control program stored in the ROM or the storage device 47. The controller 49 is an example of a first control device in the claims.

The controller 49 takes charge of overall control of the chatbot server 40. The control device 48 is connected to the communication device 44, the storage device 47, and the like. The controller 49 controls the constituents and transmits and receives signals or data to and from the constituents.

The controller 49 reads a chatbot application and a message application from the storage device 47, executes the read applications, generates an interactive message using the chatbot application, and causes the communication device 44 to transmit and receive the interactive message to and from the information processing apparatus 30 using the message application.

Figure 5:
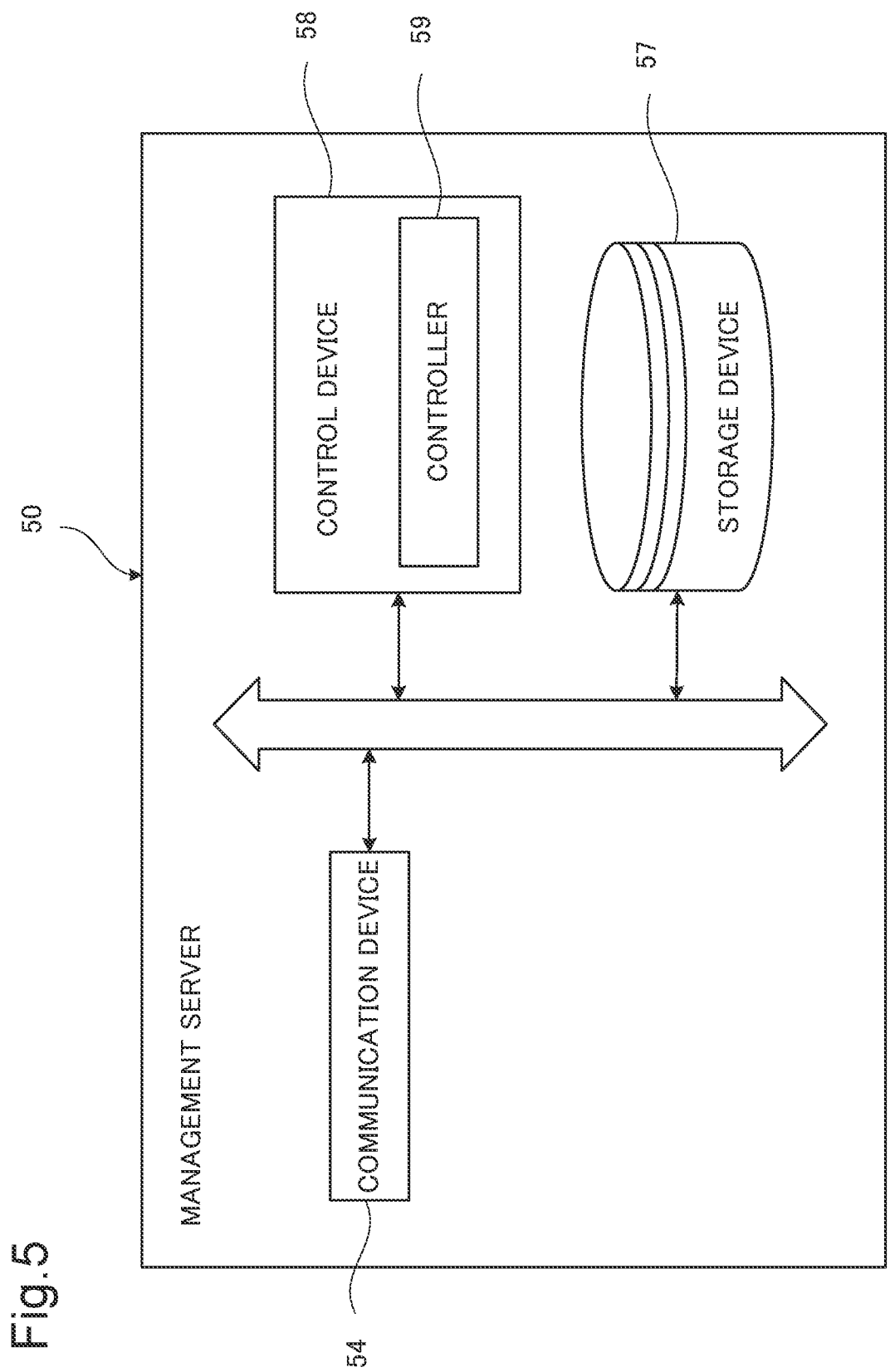
FIG. 5 is a block diagram illustrating a principal configuration of a management server in the image processing system according to the embodiment.

FIG. 5 is a block diagram illustrating a principal configuration of the management server 50. The management server 50 includes a communication device 54, a storage device 57, and a control device 58. These constituents are configured to transmit and receive data or signals via a bus.

The communication device 54 is a communication interface, is connected to the chatbot server 40 via the network N, and transmits and receives data to and from the chatbot server 40.

The storage device 57 is a large-capacity storage device such as an SSD or an HDD and stores various application programs or various types of data.

The control device 58 includes a processor, a RAM, and a ROM. The control device 58 serves as a controller 59 by causing the processor to execute a control program stored in the ROM or the storage device 57. The controller 59 is an example of a second control device in the claims.

The controller 59 takes charge of overall control of the management server 50. The control device 58 is connected to the communication device 54, the storage device 57, and the like. The controller 59 controls the constituents and transmits and receives signals or data to and from the constituents. The controller 59 stores and manages image data or the like in the storage device 57.

In the image processing system Sy having the aforementioned configuration, the chatbot server 40 transmits and receives an interactive message to and from the information processing apparatus 30 and receives image data transmitted from the information processing apparatus 30. The chatbot server 40 generates job setting information J on the basis of the received image data and the message, sets job identification information ID in association with the job setting information J, and stores the image data, the job setting information J, and the job identification information ID in a storage on the network. The chatbot server 40 causes the management server 50 to select an image forming apparatus 10 having a function suitable for the job setting information J, generates a QR code indicating the job identification information ID and an address of the storage, and transmits position information indicating a position of the selected image forming apparatus 10 (hereinafter simply referred to as the position of the image forming apparatus 10) and the generated QR code to the information processing apparatus 30.

The position and the QR code of the image forming apparatus 10 are displayed on the display device 31 of the information processing apparatus 30. A user of the information processing apparatus 30 sees the position of the image forming apparatus 10, moves to the image forming apparatus 10, and causes the code reader 21 of the image forming apparatus 10 to read the QR code displayed on the display device 31. The image forming apparatus 10 acquires job identification information ID and an address of the storage indicated by the QR code, receives the image data and the job setting information J associated with the job identification information ID from the storage via the management server 50, and executes a job (such as a print job or a facsimile job) on the basis of the image data and the job setting information J.

Accordingly, an image is processed by the image forming apparatus 10 on the basis of the premise that a user holds up the QR code over the code reader 21 of the image forming apparatus 10. Accordingly, it is possible to keep security of the image to be processed by the image forming apparatus 10 high.

Figure 6:
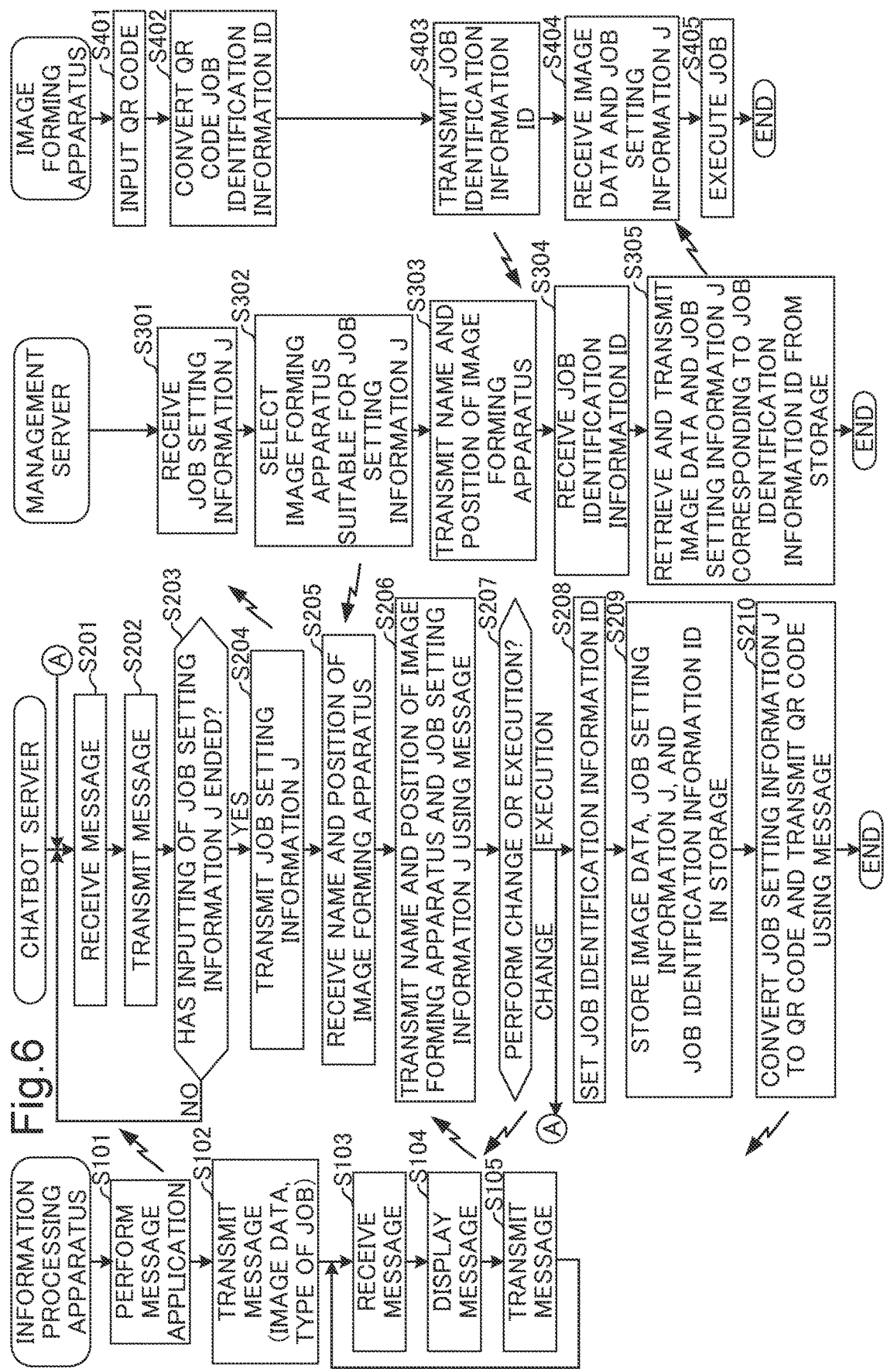
FIG. 6 is a flowchart illustrating a control routine from transmission or reception of an interactive message between the chatbot server and the information processing apparatus to execution of a job.

A control routine from transmission and reception of an interactive message between the chatbot server 40 and the information processing apparatus 30 to execution of a job will be described below with reference to the flowchart illustrated in FIG. 6, or the like.

In the information processing apparatus 30, through a user's operation of a GUI displayed on the screen of the display device 31 or the like, an instruction to execute a message application is input via the touch panel 33 and an instruction to designate the chatbot server 40 as a destination of a message is input. The controller 39 reads and executes the message application from the storage device 37 in response to the instructions (S101) and displays a message window on the screen of the display device 31.

Here, through the user's operation of a software keyboard displayed on the screen of the display device 31 or the like, it is assumed that information indicating a file name of image data and a job type are input from the window displayed on the screen of the display device 31 and an instruction to transmit the image data and a message is input via the touch panel 33. In response to this input, the controller 39 reads image data with the file name from the storage device 37 and transmits information indicating the read image data and the job type to the chatbot server 40 designated as a destination of the message from the communication device 34 via the network N (S102).

In the chatbot server 40, when a message indicating image data and a job type is received by the communication device 44 (S201), the controller 49 stores the image data in the storage device 47 and reads and executes a chatbot application and a message application from the storage device 47. The controller 49 generates a response message to the received message using the chatbot application and transmits the response message from the communication device 44 to the information processing apparatus 30 via the network N using the message application (S202). Accordingly, transmission and reception of an interactive message with the information processing apparatus 30 is started.

In the information processing apparatus 30, when a message from the chatbot server 40 is received by the communication device 34 (S103), the controller 39 displays the received message on the screen of the display device 31 (S104). Then, when a response message to the received message is input via the touch panel 33 through a user's operation of a software keyboard displayed on the screen of the display device 31 or the like, the controller 39 transmits the response message from the communication device 34 to the chatbot server 40 via the network N using the message application (S105).

While transmitting and receiving messages to and from the information processing apparatus 30 (S201 and S202), the controller 49 of the chatbot server 40 generates job setting information J from the transmitted and received message using the chatbot application and transmits the generated job setting information J as a message from the communication device 44 to the information processing apparatus 30 via the network N.

In the information processing apparatus 30, when the job setting information J is received by the communication device 34 (S103), the controller 39 displays the received job setting information J on the screen of the display device 31 (S104).

Figure 7:
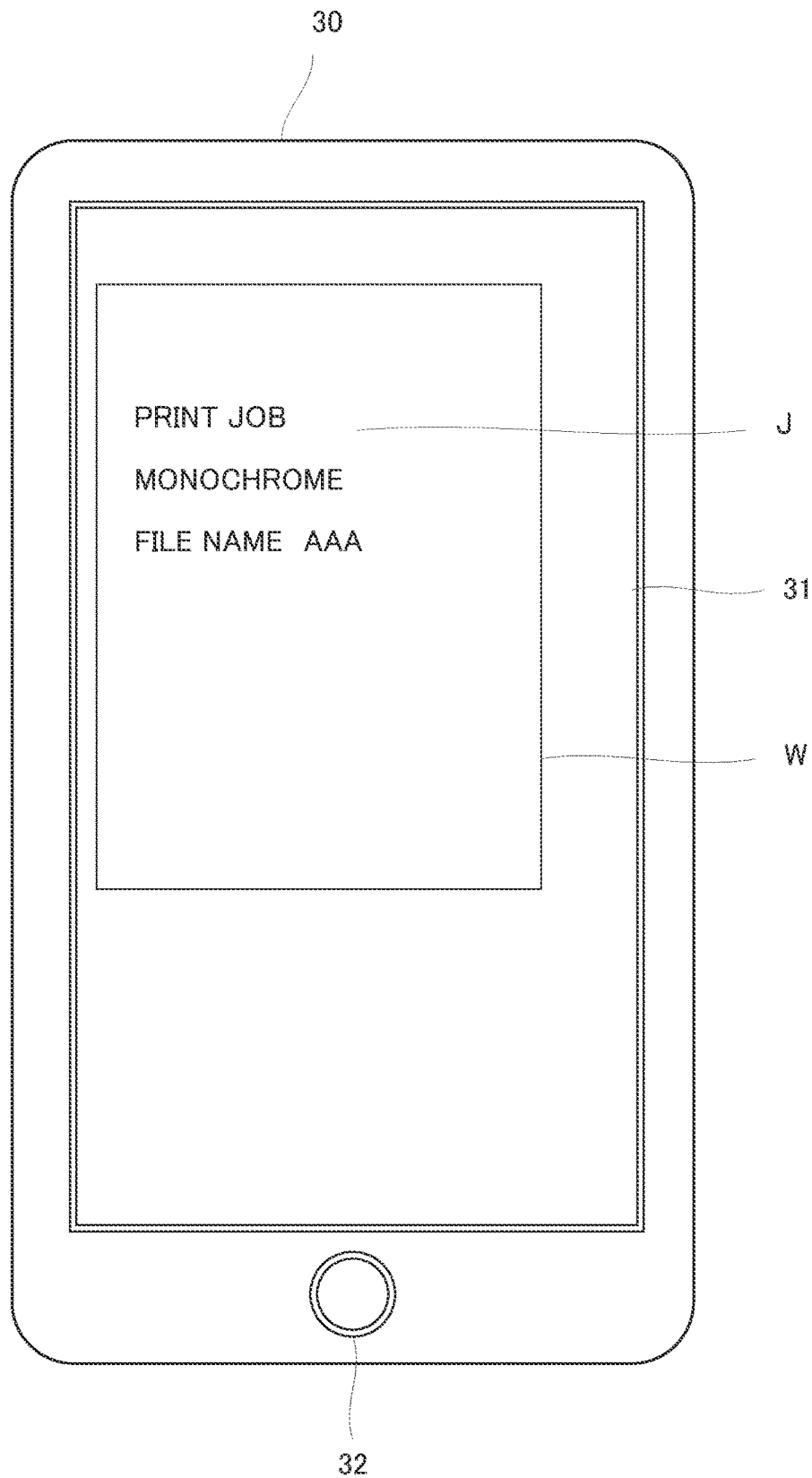
FIG. 7 is a diagram illustrating a window in which job setting information or the like is displayed on a screen of a display device of the information processing apparatus.

For example, the controller 49 of the chatbot server 40 determines a print job of recording an image on a recording sheet as a job type on the basis of the transmitted and received messages, determines that it is printing in monochrome, generates job setting information J indicating the print job and the printing in monochrome, and transmits the job setting information J from the communication device 44 to the information processing apparatus 30. The controller 39 of the information processing apparatus 30 displays a window W illustrated in FIG. 7 on the screen of the display device 31 on the basis of the job setting information J. In the window W illustrated in FIG. 7, the print job, the printing in monochrome, and the like are displayed as the job setting information J. The controller 49 of the chatbot server 40 may receive a message for designating color, single-sided or double-sided printing, the number of prints, a size of a recording sheet, and the like in addition to the print job and the printing in monochrome from the user via the touch panel 33 of the information processing apparatus 30 and generate details indicated by the message as the job setting information J.

At this time, the controller 49 of the chatbot server 40 determines whether inputting of the job setting information J has ended on the basis of the message received from the information processing apparatus 30 using the chatbot application (S203). When the controller 49 determines that inputting of the job setting information J has not ended ("NO" in S203), the processes of S201 and S202 are repeated.

When it is determined that inputting of the job setting information J of the image data has ended on the basis of the message received from the information processing apparatus 30 ("YES" in S203), the controller 49 of the chatbot server 40 transmits the job setting information J from the communication device 34 to the management server 50 via the network N (S204).

In the management server 50, when the job setting information J is received by the communication device 54 (S301), the controller 59 determines the print job, color or monochrome, single-sided or double-sided printing, the number of prints, a size of a recording sheet, and the like indicated by the job setting information J. In the storage device 57, a function table in which a function, a name, and a position of an image forming apparatus 10 are registered is stored in advance for each image forming apparatus 10. The controller 59 selects an image forming apparatus 10 having a function suitable for the print job, color or monochrome, single-sided or double-sided printing, the number of prints, a size of a recording sheet, and the like with reference to the function table and acquires the name and the position of the selected image forming apparatus 10 (S302). Then, the controller 59 transmits the acquired name and position of the image forming apparatus 10 from the communication device 54 to the chatbot server 40 via the network N (S303).

In the chatbot server 40, when the name and the position of the image forming apparatus 10 are received by the communication device 44 (S205), the controller 49 generates a message indicating the name and the position of the image forming apparatus 10 and the job setting information J using the chatbot application and transmits the generated message from the communication device 44 to the information processing apparatus 30 via the network N using the message application (S206).

In the information processing apparatus 30, when the message is received by the communication device 34 (S103), the controller 39 displays the message on the screen of the display device 31 (S104).

Figure 8:
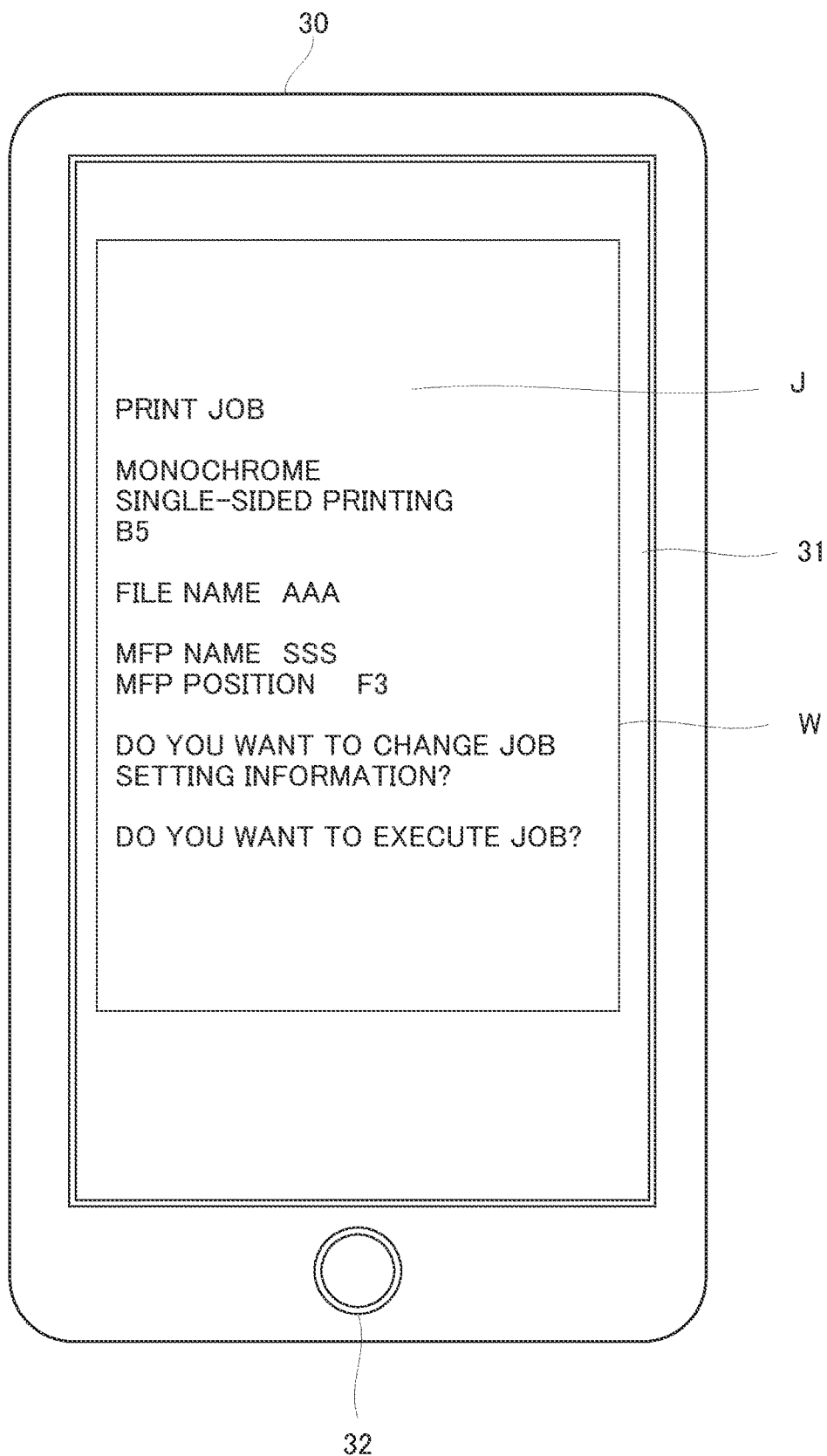
FIG. 8 is a diagram illustrating a window in which a name, a position, and the like of an image forming apparatus are displayed on the screen of a display device of the information processing apparatus.

For example, as illustrated in FIG. 8, the job setting information J and the name and the position of the image forming apparatus 10 having a function suitable for the job setting information J are displayed as a message in the window W on the screen of the display device 31. Accordingly, a user is notified of the job setting information J and the name and the position of the image forming apparatus 10 having a function suitable for the job setting information J. This message includes text which is a message for prompting the user to select change of the job setting information J or execution of the job.

In the information processing apparatus 30, when a response message to the received message is input via the touch panel 33 through a user's operation of a software keyboard displayed on the screen of the display device 31 or the like, the controller 39 transmits the response message from the communication device 34 to the chatbot server 40 via the network N (S105).

At this time, for example, it is assumed that the controller 39 of the information processing apparatus 30 transmits a response message for instructing to change the job setting information J from the communication device 34 to the chatbot server 40 according to an instruction from the user (S105). In this case, in the chatbot server 40, the message is received by the communication device 44, and the controller 49 determines that the job setting information J is to be changed on the basis of the message ("change" in S207), repeats S201 and S202, and changes the job setting information J on the basis of an interactive message. When it is determined that inputting of the job setting information J has ended ("YES" in S203), the controller 49 transmits the changed job setting information J from the communication device 34 to the management server 50 (S204).

In the management server 50, when the changed job setting information J is received by the communication device 54 (S301), the controller 59 selects an image forming apparatus 10 having a function suitable for the changed job setting information J by performing S302 again and transmits the name and the position of the selected image forming apparatus 10 from the communication device 54 to the chatbot server 40 (S303).

In the chatbot server 40, when the name and the position of the selected image forming apparatus 10 are received by the communication device 44 (S205), the controller 49 generates a message indicating the name and the position of the image forming apparatus 10 and the job setting information J and transmits the generated message from the communication device 44 to the information processing apparatus 30 via the network N (S206).

In the information processing apparatus 30, when the message is received by the communication device 34 (S103), the controller 39 displays the received message on the screen of the display device 31 (S104). Accordingly, the message illustrated in FIG. 8 is updated and displayed.

In the information processing apparatus 30, when an instruction indicating that change of the job setting information J is not necessary is input via the touch panel 33 or the like by a user, the controller 39 transmits a response message indicating execution of a job to the received message from the communication device 34 to the chatbot server 40 (S105).

In the chatbot server 40, when the message indicating execution of a job is received by the communication device 44, the controller 49 determines execution of a job on the basis of the message ("execution" in S207), generates and sets job identification information ID in association with the image data and the job setting information J received in S201 (S208), and stores the image data, the job setting information J, and the job identification information ID in the storage on the network N via the communication device 44 (S209). Then, the controller 49 converts the job identification information ID and an address of the storage to a QR code including the job identification information ID and the address of the storage, generates a message with the QR code, and transmits the message from the communication device 44 to the information processing apparatus 30 via the network N (S210).

Figure 9:
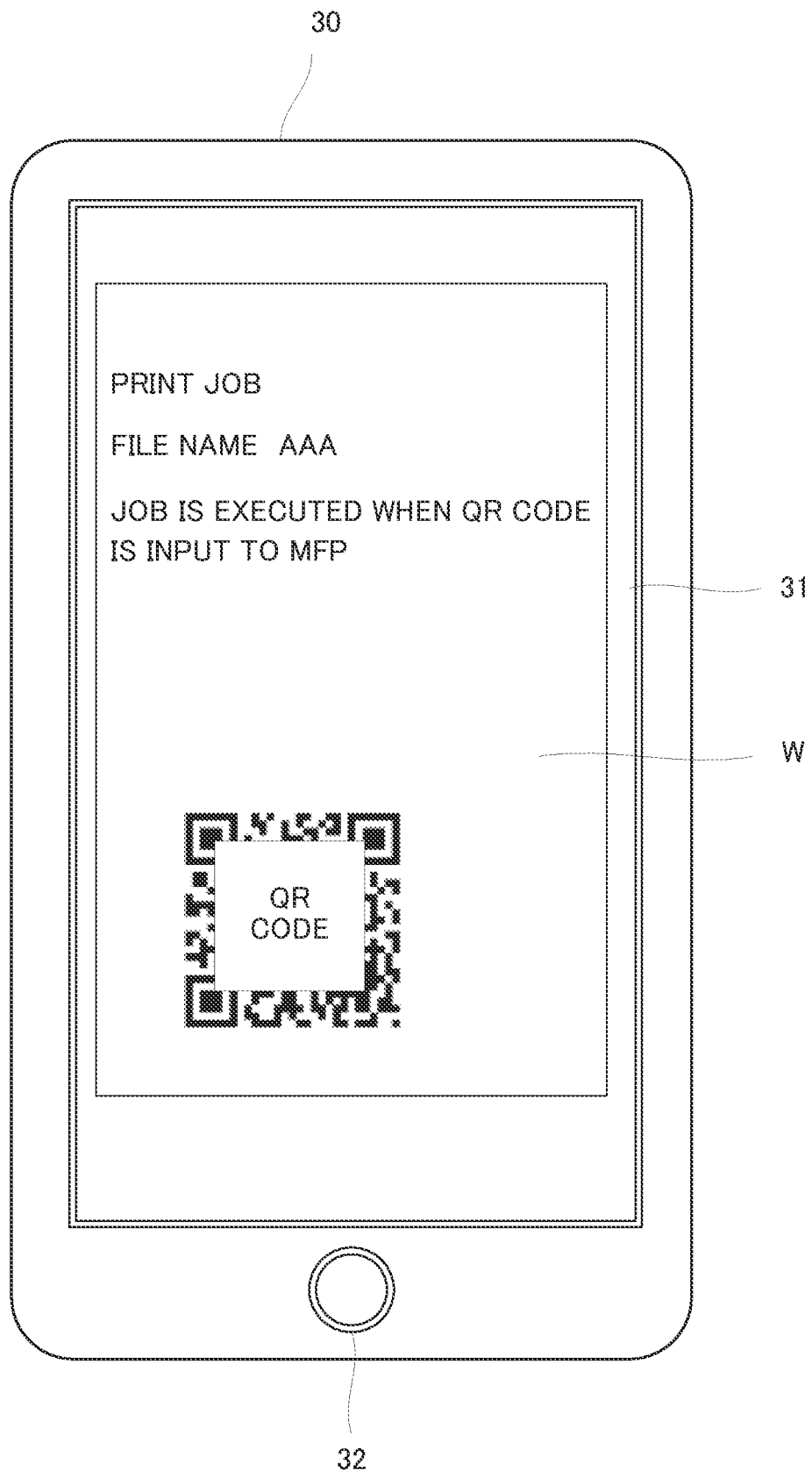
FIG. 9 is a diagram illustrating a window in which a QR code (registered trademark) or the like is displayed on the screen of a display device of the information processing apparatus.

In the information processing apparatus 30, when the message with the QR code is received by the communication device 34 (S103), the controller 39 displays the received message on the screen of the display device 31 (S104). For example, as illustrated in FIG. 9, the QR code and a usage of the QR code are displayed as a message in the window W on the screen of the display device 31.

A user can ascertain the position of the image forming apparatus 10 from the message displayed on the screen of the display device 31 illustrated in FIG. 8. The user carries the information processing apparatus 30 on which the QR code is displayed. The user moves to the image forming apparatus 10 with the information processing apparatus 30 carried, and the QR code displayed on the screen of the display device 31 of the information processing apparatus 30 is read and input by the code reader 21.

When the QR code is read and input by the code reader 21 (S401), the controller 19 of the image forming apparatus 10 converts the input QR code to the job identification information ID and the address of the storage (S402) and transmits the job identification information ID and the address of the storage from the communication device 14 to the management server 50 via the network N (S403).

In the management server 50, when the job identification information ID and the address of the storage are received by the communication device 54 (S304), the controller 59 retrieves the storage at the address on the network N using the communication device 54, reads and acquires the image data and the job setting information J associated with the job identification information ID from the storage, and transmits the acquired image data and the acquired job setting information J from the communication device 54 to the image forming apparatus 10 via the network N (S305).

In the image forming apparatus 10, when the image data and the job setting information J are received by the communication device 14 (S404), the controller 19 processes the image data by executing a job on the basis of the image data and the job setting information J (S405). For example, when the job setting information J indicates a print job and printing in monochrome, the controller 19 inputs the image data to the image forming device 16 while controlling the image forming device 16, records an image indicated by the image data on a recording sheet in monochrome, and outputs the recording sheet.

In this way, in this embodiment, an interactive message is transmitted and received between the information processing apparatus 30 and the chatbot server 40, the job setting information J is generated, the image data and the job setting information J are stored in the storage on the network N in association with the job identification information ID, the job identification information ID and the address of the storage are converted to a QR code, the QR code is displayed on the screen of the display device 31 of the information processing apparatus 30, the QR code is read by the code reader 21 of the image forming apparatus 10, the QR code is converted to the job identification information ID and the address of the storage, the image data and the job setting information J associated with the job identification information ID are transmitted from the storage at the address on the network N to the image forming apparatus 10, and a job is executed on the basis of the job setting information J. Accordingly, it is possible to keep security of an image high without imposing labor on a user. That is, it is possible to enhance convenience in setting a job by setting the job using a chatting box and to enhance security of an image which is processed by the image forming apparatus 10 by causing the image forming apparatus 10 to record an image on the premise that the QR code is read.

In the image processing system described in the BACKGROUND, information of an available image processing apparatus is displayed on a chatting screen for a user, print data is transmitted to the image processing apparatus, and a print job is executed by the image processing apparatus. However, since it takes time for the user to move to the image processing apparatus and to take a printed sheet, there is a likelihood that the recording sheet will be left alone and security of printed details on the recording sheet will not be maintained. On the other hand, according to this embodiment, it is possible to enhance convenience at the time of setting a job and to enhance security of an image which is processed by the image forming apparatus.

In the embodiment, a QR code is exemplified, but another type of two-dimensional code may be used or a one-dimensional code such as a barcode may be used.

In the embodiment, the controller 59 of the management server 50 selects an image forming apparatus 10 having a function suitable for job setting information J with reference to the function table in which a function, a name and a position of an image forming apparatus 10 are registered for each image forming apparatus 10, but when a plurality of image forming apparatuses 10 having a function suitable for the job setting information J are selected, an image forming apparatus 10 closest to the position of the information processing apparatus 30 may be selected out of the selected image forming apparatuses 10 and the position of the selected image forming apparatus 10 may be transmitted from the communication device 54 to the chatbot server 40.

In this case, a GPS receiver is provided in the information processing apparatus 30, the position of the information processing apparatus 30 is detected by the GPS receiver, and the position of the information processing apparatus 30 is transmitted from the information processing apparatus 30 to the management server 50 via the chatbot server 40. In the management server 50, when the position of the information processing apparatus 30 is received by the communication device 34, the controller 59 acquires positions of a plurality of image forming apparatuses 10 having a function suitable for the job setting information J with reference to the function table, selects an image forming apparatus 10 closest to the position of the information processing apparatus 30, and transmits the position of the selected image forming apparatus 10 from the communication device 54 to the chatbot server 40. The position of the image forming apparatus 10 is transmitted from the chatbot server 40 to the information processing apparatus 30 and is displayed on the display device 31 of the information processing apparatus 30, and thus a user is notified of the position.

The controller 49 of the chatbot server 40 may transmit and receive an interactive message to and from a plurality of information processing apparatuses 30 using the communication device 44 (group chatting), unify the job setting information J when the job setting information J transmitted from the information processing apparatuses 30 is received by the communication device 44, and associate the image data and the unified job setting information J with the job identification information ID. In this case, the image forming apparatus 10 executes a job on the basis of the unified job setting information J.

A job type is not limited to the print job, but may be a facsimile job or the like. Details of the job setting information J may differ depending on the job type.

The information processing apparatus 30 is not limited to a smartphone or a mobile phone, but may be a personal computer.

The storage on the network N is not particularly limited and may be provided in another server or the management server 50. In the management server 50, the storage device 57 can be used as the storage on the network N.

The configurations and the processes of the embodiment described above with reference to FIGS. 1 to 9 are merely an example of the present disclosure and does not intend the present disclosure to be limited to the configurations and the processes.

While the present disclosure has been described in detail with reference to the embodiments thereof, it would be apparent to those skilled in the art the various changes and modifications may be made therein within the scope defined by the appended claims.

What is claimed is:

1. An image processing system comprising an information processing apparatus, a chatbot server, a management server, and an image forming apparatus that perform data communication with each other via a network, wherein the chatbot server includes:
a first communication device that performs data communication with the information processing apparatus and the management server via the network; and
a first control device,
the first control device causes the first communication device to transmit and receive an interactive message to and from the information processing apparatus,
when image data and the message transmitted from the information processing apparatus are received by the first communication device, the first control device generates job setting information on the basis of the message and causes the first communication device to transmit the generated job setting information to the management server,
when a position of the image forming apparatus having a function suitable for the job setting information is transmitted from the management server and is received by the first communication device, the first control device sets job identification information in association with the received image data and the received job setting information and causes the first communication device to transmit the image data, the job setting information, and the job identification information to a storage on the network, and
the first control device generates a one-dimensional code or two-dimensional code indicating the job identification information and causes the first communication device to transmit the position of the image forming apparatus and the one-dimensional code or two-dimensional code to the information processing apparatus,
wherein the management server includes:
a second communication device that performs data communication with the chatbot server and the image forming apparatus via the network; and
a second control device,
when the job setting information transmitted from the chatbot server is received by the second communication device, the second control device selects the image forming apparatus having a function suitable for the received job setting information and causes the second communication device to transmit the position of the selected image forming apparatus to the chatbot server, and
when the job identification information transmitted from the image forming apparatus is received by the second communication device, the second control device acquires the image data and the job setting information associated with the received job identification information from the storage on the network using the second communication device and causes the second communication device to transmit the acquired image data and the acquired job setting information to the image forming apparatus,
wherein the information processing apparatus includes:
a third communication device that performs data communication with the chatbot server via the network;
a display device; and
a third control device that displays the position of the image forming apparatus and the one-dimensional code or two-dimensional code on the display device when position information indicating the position of the image forming apparatus and the one-dimensional code or two-dimensional code which are transmitted from the chatbot server are received by the third communication device, and wherein the image forming apparatus includes:
a fourth communication device that performs data communication with the management server via the network;
an input device to which the one-dimensional code or two-dimensional code is input; and
a fourth control device,
when the one-dimensional code or two-dimensional code is input to the input device, the fourth control device converts the input one-dimensional code or two-dimensional code to job identification information and causes the fourth communication device to transmit the converted job identification information to the management server, and
when the image data and the job setting information transmitted from the management server are received by the fourth communication device, the fourth control device performs processing of the image data on the basis of the job setting information.

2. The image processing system according to claim 1, wherein the information processing apparatus further includes a touch panel,
wherein the third control device of the information processing apparatus identifies image data and a type of a job on the basis of information received by the touch panel and causes the third communication device to transmit the image data and a message indicating the type of a job to the chatbot server, and
wherein the first control device of the chatbot server generates job setting information on the basis of the image data and the type of a job when the first communication device receives the message indicating the image data and the type of a job from the information processing apparatus.

3. The image processing system according to claim 2, wherein, when the job identification information is set, the first control device of the chatbot server causes the first communication device to transmit a message indicating the job identification information to the information processing apparatus before the job identification information is transmitted to the management server,
wherein the third control device displays the message indicating the job identification information on the display device when the third communication device of the information processing apparatus receives the message indicating the job identification information from the chatbot server, and causes the third communication device to transmit a change instruction for changing the job identification information to the chatbot server when the change instruction is received via the touch panel, and
wherein the first control device of the chatbot server changes details of the job setting information on the basis of details indicated by the change instruction when the change instruction is received by the first communication device.

4. The image processing system according to claim 1, wherein a plurality of the information processing apparatuses are provided, and
wherein the first control device of the chatbot server causes the first communication device to transmit and receive an interactive message to and from the information processing apparatuses and unifies each of the job setting information when the job setting information transmitted from the information processing apparatuses is received by the first communication device.

5. The image processing system according to claim 1, wherein a plurality of the image forming apparatuses are provided, and
wherein the second control device of the management server selects one image forming apparatus having a function suitable for the job setting information out of the plurality of image forming apparatuses and causes the second communication device to transmit a position of the selected image forming apparatus to the chatbot server.

6. The image processing system according to claim 1, wherein a plurality of the image forming apparatuses are provided, and
wherein the information processing apparatus further includes a position detection device that detects a position of the information processing apparatus,
wherein the third control device of the information processing apparatus causes the third communication device to transmit position information indicating the position of the information processing apparatus detected by the position detection device to the chatbot server, and
wherein the second control device of the management server selects a plurality of image forming apparatuses having a function suitable for the job setting information out of the plurality of image forming apparatuses, selects one image forming apparatus located closest to the information processing apparatus by comparing the position of the information processing apparatus indicated by the position information with preset positions of the selected image forming apparatuses when the position information transmitted from the information processing apparatus and relayed and acquired by the chatbot server is received by the second communication device, and causes the second communication device to transmit the position of the selected image forming apparatus to the chatbot server.

7. The image processing system according to claim 1, wherein the management server includes a storage device that serves as the storage on the network.

8. An image processing system comprising a chatbot server and a management server that perform data communication with an information processing apparatus and an image forming apparatus via a network,
wherein the chatbot server includes:
a first communication device that performs data communication with the information processing apparatus and the management server via the network; and
a first control device,
the first control device causes the first communication device to transmit and receive an interactive message to and from the information processing apparatus,
when image data and the message transmitted from the information processing apparatus are received by the first communication device, the first control device generates job setting information on the basis of the message and causes the first communication device to transmit the generated job setting information to the management server,
when a position of the image forming apparatus having a function suitable for the job setting information is transmitted from the management server and is received by the first communication device, the first control device sets job identification information in association with the received image data and the received job setting information and causes the first communication device to transmit the image data, the job setting information, and the job identification information to a storage on the network for storing by the storage, and
the first control device generates a one-dimensional code or two-dimensional code indicating the job identification information and causes the first communication device to transmit the position of the image forming apparatus and the one-dimensional code or two-dimensional code to the information processing apparatus, and
wherein the management server includes:
a second communication device that performs data communication with the chatbot server and the image forming apparatus via the network; and
a second control device,
when the job setting information transmitted from the chatbot server is received by the second communication device, the second control device selects the image forming apparatus having a function suitable for the received job setting information and causes the second communication device to transmit the position of the selected image forming apparatus to the chatbot server, and
when the job identification information transmitted from the image forming apparatus is received by the second communication device, the second control device acquires the image data and the job setting information associated with the received job identification information from the storage on the network using the second communication device and causes the second communication device to transmit the acquired image data and the acquired job setting information to the image forming apparatus.

* * * * *